United States Patent
Liu et al.

(10) Patent No.: US 6,884,504 B2
(45) Date of Patent: Apr. 26, 2005

(54) REPOSITIONABLE ADHESIVE LABEL FOR OPTICAL RECORDING MEDIA

(75) Inventors: Jacob J. Liu, Woodbury, MN (US); Timothy J. O'Leary, White Bear Lake, MN (US); Ned B. Johnson, Minneapolis, MN (US); Bruce D. Kluge, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 21 days.

(21) Appl. No.: 09/849,147

(22) Filed: May 4, 2001

(65) Prior Publication Data

US 2002/0192465 A1 Dec. 19, 2002

(51) Int. Cl.$^7$ .............................. B32B 7/12
(52) U.S. Cl. .................. 428/343; 428/40.1; 428/354; 428/355 R; 428/355 RA; 428/355 BL; 283/81; 525/89; 525/90; 525/94
(58) Field of Search ................ 428/355 RA, 355 BL, 428/354, 343, 355 R, 40.1; 283/81; 525/89, 90, 94

(56) References Cited

U.S. PATENT DOCUMENTS

| | | |
|---|---|---|
| 3,705,908 A | 12/1972 | Leir ................ 260/327 M |
| 4,833,193 A | 5/1989 | Sieverding .............. 524/486 |
| 5,027,465 A | 7/1991 | McKay |
| 5,316,344 A | 5/1994 | Popat et al. ................ 283/81 |
| 5,670,598 A | 9/1997 | Leir et al. .................. 528/28 |
| 5,715,493 A | 2/1998 | Stephenson .............. 396/429 |
| 5,715,934 A | 2/1998 | Tobol et al. .............. 206/232 |
| 5,729,963 A | 3/1998 | Bird .......................... 53/471 |
| 5,770,289 A | 6/1998 | Tracy ..................... 428/40.1 |
| 5,851,644 A | 12/1998 | Bennett et al. ........ 428/355 BL |
| 5,851,664 A | 12/1998 | Bennett et al. |
| 5,888,335 A | 3/1999 | Kobe et al. .............. 156/306.3 |
| 5,908,695 A | 6/1999 | Kobe et al. ................ 428/354 |
| 5,958,177 A | 9/1999 | Claussnitzer ............. 156/391 |
| 6,004,670 A | 12/1999 | Kobe et al. ................ 428/343 |
| 6,014,788 A | 1/2000 | Jaffri |
| 6,099,682 A | 8/2000 | Krampe et al. ........... 156/289 |
| 6,148,891 A | 11/2000 | Lee .......................... 156/391 |
| 6,168,841 B1 | 1/2001 | Chen ....................... 428/40.1 |
| 6,189,590 B1 | 2/2001 | Tsay ........................ 156/581 |
| 6,196,290 B1 | 3/2001 | Tracy et al. .............. 156/391 |
| 6,210,524 B1 * | 4/2001 | Josephy ................... 156/344 |
| 6,240,991 B1 | 6/2001 | Claussnitzer ............. 156/391 |
| 6,463,026 B1 | 10/2002 | Anderson |
| 2002/0192465 A1 * | 12/2002 | Liu et al. .................. 428/354 |

FOREIGN PATENT DOCUMENTS

| | | |
|---|---|---|
| EP | 0443263 | 7/1995 |
| EP | 0855712 | 3/1997 |
| EP | 0 938 082 A2 | 8/1999 |
| JP | 10035767 | 2/1998 |
| JP | 11-255223 | 9/1999 |
| JP | 11-321958 | 11/1999 |
| JP | 2000128265 | 5/2000 |
| WO | WO 98/38036 | 9/1998 |
| WO | WO 00/77117 A1 | 12/2000 |

OTHER PUBLICATIONS

Dahlquist Criterion, "Handbook of Pressure Sensitive Adhesive Technology," $2^{ND}$ Edition, pp. 172–176, Ed By Satas, Van Nostrand Reinhold, New York (1989).

(Continued)

Primary Examiner—Daniel Zirker
(74) Attorney, Agent, or Firm—George W. Jonas

(57) ABSTRACT

A label for applying to an optical recording media including a film or paper layer coated with an ink receptive coating on one major surface and a layer of repositionable non-pressure sensitive adhesive coated onto the other major surface.

10 Claims, 4 Drawing Sheets

OTHER PUBLICATIONS

Product Pictures, (pp. 1–7) of Memorex CD & DVD Label-Master® System Pro, available for purchase prior to Aug. 8, 2002.

Product Pictures, (pp. 1–6) of Mead 50 CD–ROM LaserLine Protective Sleeves, available for purchase prior to Aug. 8, 2002.

Product Pictures, (pp. 1–2) of Maxell DVD/CD–ROM Disc Shield Kit, available for purchase prior to Aug. 8, 2002.

Product Pictures, (pp. 1–2) of Curtis CD Cleaning Kit, available for purchase prior to Aug. 8, 2002.

Product Pictures, (pp. 1–3) Discwasher CD Stealth, Radial CD Cleaning System, available for purchase prior to Aug. 8, 2002.

Product Pictures, (pp. 1–4) 3M Scotch–Brite CD & DVD Cleaning Cloth with Unique Micro–Texture, available for purchase prior to Aug. 8, 2002.

Product Pictures, (pp. 1–2) 3 M Scotch Disc Wipes and Spray Cleaner for CDs, CD–ROMs, DVDs, DVD–ROMs, available for purchase prior to Aug. 8, 2002.

Product Pictures, (pp. 1–4)3M Scotch CD and CD–ROM Surface Scratch Remover Kit, available for purchase prior to Aug. 8, 2002.

Product Pictures, (pp. 1–5) Fellowes CD Protector Damage Resistant Film, available for purchase prior to Aug. 8, 2002.

Product Pictures, (pp. 1–2) Recoton CD Cleaning Wipes, available for purchase prior to Aug. 8, 2002.

Product Pictures, (pp. 1–3) discwasher® CD Cleaning Cloth, Micro–Fibre, Lint–Free Cleaning Cloth, available for purchase prior to Aug. 8, 2002.

Product Pictures, (pp. 1–3) Case Logic, CD ROM ProSleeves, available for purchase prior to Aug. 8, 2002.

Product Pictures, (pp. 1–2) Maxell CD/CD–ROM Dry Cleaning Clothes with Handy Pop–Up Dispenser, available for purchase prior to Aug. 8, 2002.

Product Pictures, (pp. 1–4) CDfender, Protective Film That Prevents CD Scratches, available for purchase prior to Aug. 8, 2002.

Product Pictures, (pp. 1–3) COMP*USA*, CDR/CD Cleaning Solution, available for purchase prior to Aug. 8, 2002.

Online product catalog for Maxell Corporation of America (*http://www.maxell.com*) available prior to Aug. 8, 2002, pp. 1–2.

Front and back image of packaging (pages 1 and 2) "Maxell DVD Cleaning Cloths" front and back image of container (pages 3 and 4) one cleaning cloth (attached to page 5), publicly known by others in this country prior to Aug. 8, 2002.

Front and back image of packaging (pages 1 and 2) "Scotch Disc Cleaner for CDs and DVDs" publicly known by others in this country prior to Aug. 8, 2002.

* cited by examiner

REPOSITIONABLE ADHESIVE LABEL FOR OPTICAL RECORDING MEDIA

FIELD OF THE INVENTION

This invention relates to non-pressure sensitive adhesive coated labels and more particularly to non-pressure sensitive adhesive coated labels for optical recording media with repositionability.

BACKGROUND OF INVENTION

Optical discs, including CD, LD, VCD, DVD, CD-R, and DVD-R, are thin circular plastic discs with various functional layers, generally constructed of polycarbonate. The proliferation of optical disc has become extensive. In addition, in recent years, recordable or writable compact discs have grown in popularity. Further, these discs have been used for archival data storage, immediate distribution of data and for many demonstration purposes.

Due to the popularity of optical discs, whether writable or read only, users find that they have more and more optical discs. Therefore, management of optical discs becomes a difficult job. Moreover, optical discs have very large data memory size, that is, users have to put identification on each disc to tell what data has been stored in the disc. Users may also value the ability to place customized graphics on each disc.

With large numbers and mass marketing, discs can be screen printed to place the content information on company logos and alike on the non-writable/readable surface of these optical recording media.

However, for single users or for small runs of discs, screenprinting is generally too cost prohibitive to be useful. Although ink marks may also be used to label discs, it is unattractive and can cause damage to the disc by scratching on the reflective layer during writing on the disc. Another known method of labeling a disc employs a direct printing using an ink jet system onto the disc surface. These systems provide a special carrier for the disc, which is printed using a conventional ink jet printer. Like direct hand marking, this method could damage disc by scratching disc surface, especially for discs lacking scratch resistance (bare discs without prelabels). Furthermore, this method may also bear ink smudging and running problem.

Labeling discs with adhesive labels seems to be the best way to identify the discs, including both content information and personal identity.

Many types of pressure sensitive adhesive (also referred to as "PSA") labels are known, including those are described by Satas (see Handbook of Pressure Sensitive Adhesive Technology, $3^{rd}$ edition, D. Satas, 1999). Pressure Sensitive Adhesive labels for optical discs are also known. The disc labels have pressure sensitive adhesive precoated on one side, protected, and delivered with silicone release liners.

Typically, disc labels have same shape (circular shape) and slightly smaller dimensions than the disc needing to be identified. They could be put onto a disc and hand-marked on the label to identify the disc. Even so, a single user may prefer to select a printable CD label and using appropriate software would configure such a label and print the CD label using a printer such as an inkjet printer or laser printer so that personalized information can be professionally put onto a disc.

The challenge arises when a user has to put a pressure sensitive adhesive label onto a disc. Unlike conventional die-cut PSA labels for pricing, product identity, office and inventory information, and stamps, disc labels must be precisely positioned onto a disc. The ring structure of a disc label has to be well positioned on top of the ring structure of the disc. Mispositioning a label on the disc will not only result in poor appearance but may also cause a disc unbalance. Playing (or spinning) an unbalanced disc could further damage the disc (through scratching) or even damage the disc player.

One way to prevent a disc label from being misaligned is to use an alignment device, such as those disclosed in U.S. Pat. Nos. 6,196,290; 6,189,590; 6,168,841; 6,148,891; 5,715,934; and EPO 1015326; EPO 0855712; and JP11255223, but this requires additional devices. U.S. Pat. No. 5,715,493 disclosed a self-guiding disc label having a proper configuration that allows the label to be aligned on a disc by guiding the label with a jewel case. Although this eliminates the use of any additional or special devices, placing a sticky label onto the device or a jewel case loaded with a disc is still difficult for the user because such a sticky backside of the label tends to stay on user's fingers rather than on a device, thus making it unwieldy to position the label.

Regardless of the currently available means of placing a CD label onto a CD, there still remains the fact that the adhesive on a majority of CD labels is a permanent, often aggressive adhesive layer. Thus, when one is placing a label, the user must get it right the first time or else.

Removable labels (as disclosed in U.S. Pat. No. 5,316,344) can be adhered and stay firmly in place and generally will remove cleanly. However, they are generally not repositionable, which means they are not reusable. Such removeability, while it allows the user to remove the label, damages the label, either by removal stress or by curl, and thus the user cannot remove the label and replace the label for alignment.

Typically, conventional labels, whether using permanent or removable adhesive layers, including labels for optical discs, are delivered and packed with silicone release liners.

Therefore, there is a great need to have a repositionable and reusable disc label, which allows a user to position the label to the disc without using any additional alignment devices or configurations. It is also a great desire in industry to make linerless labels.

SUMMARY OF INVENTION

Briefly, one aspect of the present invention provides a label for applying to a polycarbonate surface comprising a film or paper layer coated with an ink receptive coating on one major surface and a layer of repositionable non-pressure sensitive adhesive coated onto the other major surface having a storage modulus at room temperature of less than $3 \times 10^5$ Pascals.

Advantageously, the repositionable adhesive is a low tack, non-pressure sensitive adhesive that allows the adhesive side of the label to be brought into contact using very light pressure with a polycarbonate surface and requires no significant force to break the bond between the adhesive layer of the label and that surface.

Because of the nature of the adhesive layer, a printed label can be removed from the surface and repositioned, thus assuring the proper position of the label.

In another aspect, a combination of optical recording medium and a printed label is provided comprising: an optical recording medium having a first major surface and a second major surface opposite the first major surface, the first major surface is the read/write surface and the second major surface is the non-read/write surface; and a printed label having a first major surface and a second major surface opposite the first major surface, the first major surface having an ink receptive layer printed with alphanumerics, graphics or a combination thereof onto the ink receptive layer and the second major surface having a layer of respositionable npn-pressure sensitive adhesive.

Advantageously, the non-pressure sensitive adhesive useful in the present invention demonstrates selective adhesions, that is, high adhesion to targeted surface but low adhesion to undesired surfaces. Finally, the preferred non-pressure sensitive adhesive comprises thermoplastic block copolymer elastomer. Typically, targeted surfaces are a smooth surface and include polycarbonate, polyester, glass, polyvinyl chloride or protective coating layers, such as polyacrylate and reflective coatings. Such surfaces are generally found on a variety of articles including in particular the surface of optical recording media. For example, when using a rewritable optical recording device, the label can be removed and discarded, allowing a new label to be attached to the optical recording medium. Undesired surfaces typically include skin, clothing and conventional printing paper.

A further embodiment of the present invention provides a label for applying to an optical recording media comprising a backing, a repositionable non-pressure sensitive adhesive having selective adhesion on one side of backing, optionally an ink receptive coating on another side of the backing to enhance ink printing quality or writing quality, and optionally, a primer coating between the backing and the adhesive layer to enhance the adhesive bonding to the backing. Such a configuration eliminates the need for a silicone release liner.

Uniquely, because of the nature of the adhesive layer, a printed label can be removed from the optical recording medium surface and repositioned, thus assuring the proper position of the label on the optical recording media. Furthermore, when using a rewritable optical recording device, the label can be removed and discarded, allowing a new label to be attached to the optical recording medium.

The invention further relates to a method of identifying an optical disc, comprising the steps of:

(a) providing a optical disc (b) choosing a label with matched shape and size (c) optionally creating a graphic and/or content design on a computer and printing such design on a printer (d) positioning the label with realignment if necessary and applying the label onto the disc (e) optionally, hand marking onto the label.

DESCRIPTION OF THE PREFERRED EMBODIMENT(S)

The invention relates to a new class of adhesive labels having a repositionable non-pressure sensitive adhesives that exhibits selective adhesions such that there is essentially no adhesion to paper but instant adhesion to targeted surfaces (such as polycarbonate of an optical recording media). Thus, such labels offer repositionability, which in turn permits easy and aligned positioning of the label. Furthermore, the labels of present invention eliminate the need for silicone release liners. The labels usually have the same shape and slightly smaller dimensions as the discs, although this is not necessary. The labels of the present invention generally comprise, a backing and a layer of repositionable non-pressure sensitive adhesive and are illustrated by the following figures.

Figure 1:
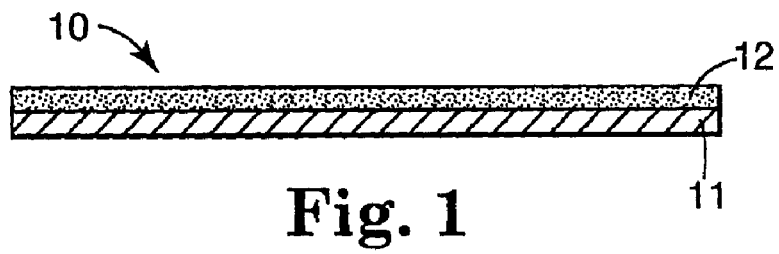
FIG. 1 is a side view of an adhesive coated back sheet.

FIG. 1 shows a side view of the core configuration, generally indicated as 10 of the repositionable label of the present invention, which is composed of a backing 11 and a layer of repositionable non-pressure sensitive adhesive 12.

Useful backings 11 for the application include papers, films, metallized papers, metallized films, foils, synthetic fabrics, non-wovens, and synthetic papers, for example Tyvek™. Useful examples for papers include uncoated paper, such as, micro-fiber uncoated paper and paper with ink reception coating on the opposite of the paper backing (coated paper), fiber board, cardstock and the like. Coated paper may be cast coated, gloss coated, and matte coated. Useful examples for films include polyvinyl chloride (vinyl film), polyester, polypropylene, polyethylene, polystyrene, acetate, and multilayer films. Backing choices may also depend on a choice of printers. For example, polyolefin films, such as polyethylene film and polypropylene film, may not be good choices of backings for toner and thermal wax type printers because the hot drum in the printer may soften films. Like paper backing, film backing may also be coated with an ink reception layer on the opposite of the film.

Preferably, repositionable adhesive 12 exhibits a low adhesion to skin or to paper but good adhesion to targeted surfaces. Low adhesion to skin is generally referred to as "low tack".

Suitable adhesives that could provide "selective adhesion" might be a homopolymer, a random copolymer, a graft copolymer, and a block copolymer. It may be crosslinked or uncrosslinked. Specific examples of the adhesives include thermoplastic block copolymer elastomer. Adhesives used with conventional labels, including CD labels, are all pressure sensitive adhesives, that display permanent and/or aggressive tackiness to a wide variety of substrates, including skin and paper, after applying only light pressure. Those adhesives are also commonly called "tacky" adhesives. An accepted quantitative description of a pressure sensitive adhesive is given by the Dahlquist criterion, which indicates that materials having a storage modulus (G') of less than about $3 \times 10^5$ Pascals (measured at 10 radians/second at room temperature, about 20° to 22° C.) have pressure sensitive adhesive properties while materials have a G' in excess of this value do not. Thus, more specifically, a repositionable non-PSA with selective adhesion, also called as "low-tack"

adhesive, or sometimes "non-tacky" adhesive, as used herein, refers to an adhesive that has a storage modulus at least above Dahlquist criterion line (>3×10$^5$) Pascals Additional discussion regarding the adhesives and the compositions for various tape applications may be found in a number of publications. For example, EP0443263 discloses a general tape construction with a low tack or non-tacky adhesive; U.S. Pat. No. 5,851,664 discloses a semiconductor wafer processing tape with a low tack or a non-tacky adhesive; U.S. Pat. Nos. 5,888,335, 5,908,695, and 6,004,670 each discloses a releasable fastener with a low tack or non-tacky adhesive; and U.S. Pat. No. 6,099,682 discloses a package sealing tape with a low tack or non-tacky adhesive.

Thermoplastic block copolymer elastomer refers to a copolymer of segmented A and B blocks or segments and which displays both thermoplastic and elastomeric behavior. Thermoplastic block copolymer elastomers useful in the invention include multi-block copolymers having radial, linear A-B diblock, and linear A-B-A triblock structures, as well as blends of these materials. A wide variety of commercially available thermoplastic block copolymer elastomers may be used (either alone or in combination) in the invention including the SOLPRENE family of materials (from Philips Petroleum Co.), the FINAPRENE family of materials (FINA), the TUFPRENE and ASAPRENE family of materials (Asahi), the STEREON family of materials (Firestone Synthetic Rubber & Latex Co.), the EUROPRENE SOL T family materials (Enichem), the VECTOR family of materials (Dexco polymers), and the CARIFLEX TR family of materials (Shell Chemical Co.). Also useful is silicone polyurea elastomer (U.S. Pat. No. 5,670,598), the SEPTON family of materials (Kuraray Co. Ltd.) and the KRATON family of materials (Shell Chemical Co.), such as D-1101, D-1102, D-1107, D-1111, D1112, D-1113, D-1114PX, D-1116, D-1117, D-1118, D-1119, D-1122X, D-1124, D-1125PX, D-1160, D-1165, D-1161, D-1184, D-1193, D-1300, D-1320X, D-4141, D-4158, D-4433, RP-6485, RP-6409, RP-6614, RP-6906, RP-6912, G-1650, G-1651, G-1652, G-1654, G-1657, G-1701, G-1702, G-1726, G-1730, G-1750, G-1765, G-1780, FG-1901, FG1921, FG-1924, and TKG-101. Mixtures of any of the above thermoplastic block copolymer elastomers are also permissible. In general, KRATONS are preferred.

Various other materials may be incorporated into the adhesive materials. For example, tackifiers or liquid rubber may be used to modify the adhesion level, quick stick level, and/or viscosity of adhesive coating solutions. Additionally, fillers, pigment, plasticizers, antioxidants, UV stabilizers, photo crosslinkers, and so forth may be also employed.

Tackifiers useful in the repositionable non-pressure sensitive adhesives are typically low molecular weight materials and are usually compatible with the thermoplastic block copolymer elastomer, by which it is meant that there is no visible evidence of phase separation of these components at room temperature. Examples of commercially available tackifiers include Wingtack95 and Wingtack 115 (from Goodyear Tire and Rubber Co.); Regarlrez1078, Regalrez1094, and Regalrez1126 (from Hercules Chemical Co. Inc.); Akron P115 (from Arakawa Forest Chemical Industries); Escorez (from Exxon Chemical Co.); and Foral 85 and Foral 105 (from Hercules Chemical Co., Inc.).

If added, the effective amounts of these additive materials may be varied as to provide a respositionable non-pressure sensitive adhesive that exhibits an adhesion in the range of 3 to 40 oz/inch to targeted surfaces and a low adhesion of less than 8 oz/inch to undesired surfaces. Typically, targeted surfaces are a smooth surface and include polycarbonate, polyester, glass, polyvinyl chloride or protective coating layers, such as polyacrylate and reflective coatings. Undesired surfaces typically include skin, clothing and conventional printing paper.

Photocrosslinkers suitable for the invention include aldehydes, such as benzaldehyde, acetaldehyde, and their substituted derivatives; ketones such as acetophenone, benzophenone and substituted derivatives such as Sandoray 1000 (Sandoz Chemicals, Inc.); quinones such as the benzoquinones, anthraquinone and their substituted derivatives; thioxanthones such as 2-isopropylthioxanthone and 2-dodecylthioxanthone; and certain chromophore substituted halomethyl-sym-triazines such as 2,4-bis-(trichloromethyl)-6-(3',4'-dimethoxyphenyl)-sym-triazine.

Figure 2A:
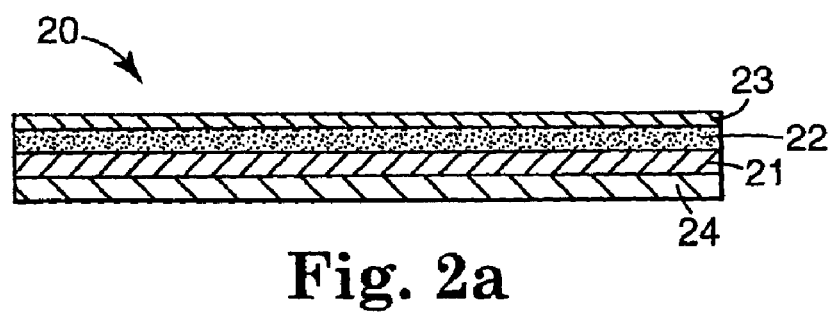
FIG. 2a is a side view of an adhesive coated sheeting with a printed graphic on the opposing major surface.
Figure 2B:
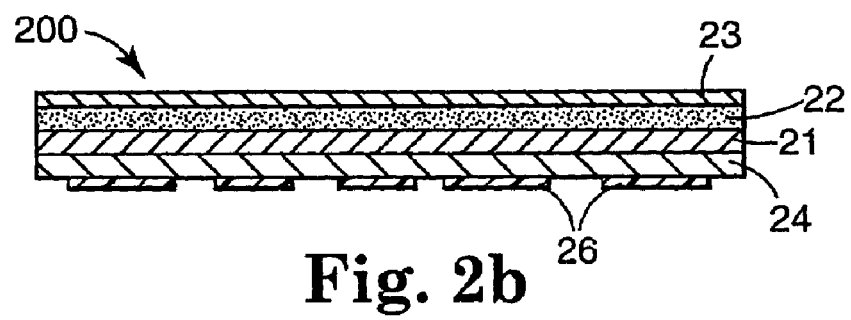
FIG. 2b is a side view of an adhesive coated sheeting with an ink receptive layer on the opposing major surface.

FIGS. 2a and 2b show a side view of the core configuration with the additional layers, generally indicated as 20 and 200, respectively. On the adhesive layer 22 is a release liner 23. On the opposite side of the backing 21 (the side opposite the adhesive layer 22) is an ink receptive layer 24.

The label construction shown in FIG. 2a can be inserted into an inkjet printer or a laser jet printer. Alphanumericas and graphics, generally referred to as 26, can be printed onto the ink receptive portion of the label. The printer mechanism is protected from the adhesive layer 22 by the release liner 23. Once the label 200 is printed, the release liner 23 can be discarded. Advantageously, the release liner could be a standard silicone-type release liner, but it could also be a piece of paper, such as standard copier or printer paper. If the release liner 23 is standard paper, once the label is printed, the paper can be "recycled" and used in the printer for regular printing, or can be discarded into a recycle bin, without environmental concerns generally associated with silicone-type release liners. The useful examples of release liner 23 may also include polyolefin coated papers, such as polyethylene coated paper and films, such as PE and PP films.

An ink reception layer is typically a water-absorbing layer that has a blend of crosslinked, water absorbing polymer particles, a water insoluble binder polymer, and optionally, inert organic or inorganic particles that impart a matte finish on at least one major surface of the substrate. The preferred water-absorbing particle is crosslinked polyvinyl pyrollidone. The preferred water insoluble binder polymer comprises acrylate and acrylate/styrene copolymers containing ammonia neutralized acrylic acid or methacrylic acid groups. The inert particles can be silica or other inorganic particle or can also be organic pigments imparting a color to the coating. Useful examples of ink reception layer formulations may include Imprintable Overprint Varnishes (commercially available from Sun Chemicals as OVP-NLJGW0830337 and OVP-RCIFV0482192).

Figure 3:
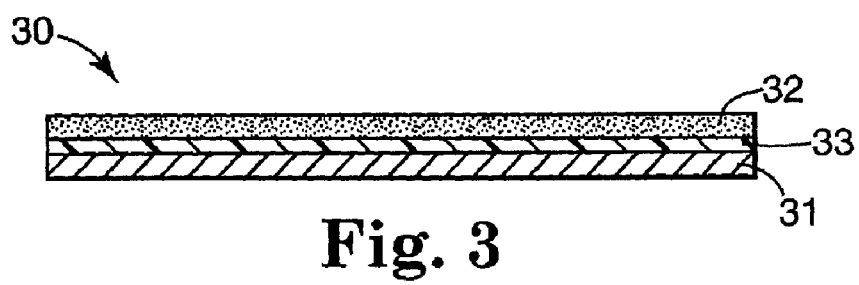
FIG. 3 is a side view of the adhesive coated back sheet having an additional primer layer between the adhesive coating and the back sheet.

FIG. 3 illustrates a core configuration, generally referred to as 30, wherein there is an additional layer 33 between the backing layer 31 and the adhesive layer 32. The additional layer 33 could be a primer layer, a barrier layer, or any kind of layer that would be typically used by someone skilled in the art of making adhesive coated articles.

A primer layer between backing and adhesive can be used to enhance adhesive anchorage onto the backing. Although chemical priming may be used in the invention, physical priming on the backing, especially for film backing or film coated paper backing, including Corona, flame, ozone, and plasma treatment, is generally preferred. Such processes for physical priming are generally known to those skilled in the art.

Barrier coating may also be needed, especially when a paper backing is used. Typical barrier coatings are thin polymer coatings, including polyethylene, polypropylene, and PET. It is found that a barrier coating makes a rough backing smoother, which in turn enhances adhesion of the adhesive on desired surfaces. Further, adhesives may be microstructured to modify peel adhesion. For example, the adhesive could be pattern-coated onto a backing or the adhesive could be coated onto a microstructured liner.

Figure 4:
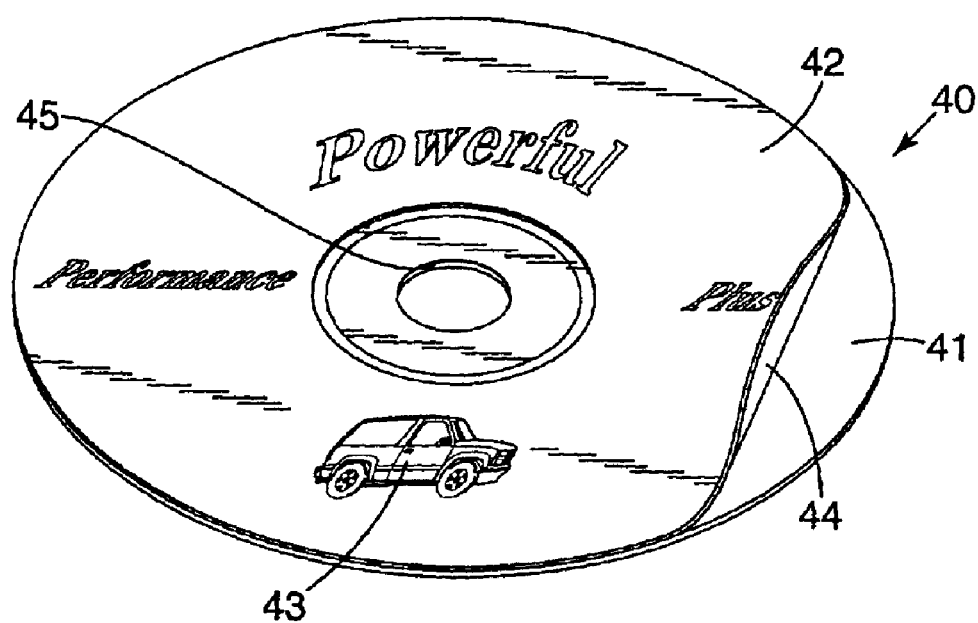
FIG. 4 is a perspective view of a printed label attached to the non-readable side of an optical recording medium.

FIG. 4 illustrates a combination, generally indicated as 40, of a label 42 printed with alphanumerics and/or graphics 42 with an optical recording medium 41. Once the label 42 is printed, the label 42 is adhered, adhesive side 44 to the non-read/write surface of the optical recording medium 41. If the initial application of the label 42 is not properly aligned with the center 45, the label can be removed and reapplied. Adhesive used in the invention has a selective adhesion between skin and disc surface—very low adhesion to skin but good adhesion to disc that allow a easy label application and reapplication if necessary to an end-user.

Figure 5:
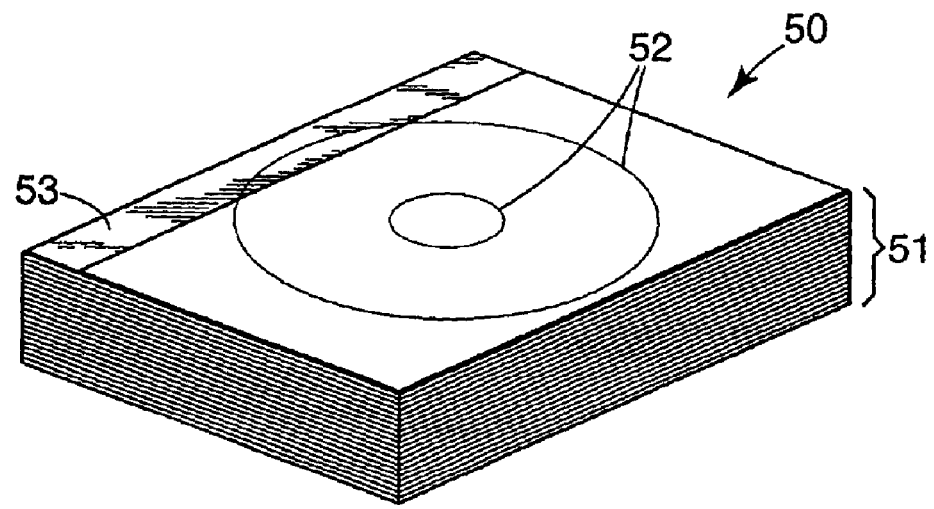
FIG. 5 is a perspective view of a stack of dispensable labels.

FIG. 5 illustrates a means of dispensing printable labels, generally indicated as 50, comprising a stack 51 of die-cut or perforated labels 52, wherein the stack 51 has a strip of adhesive 53 along the upper edge of each sheet in the stack 51. Alternatively, the die-cut labels 52 could be configured without the strip of adhesive, such that the stack 51 was similar to a standard pad of paper, wherein the stack 51 may be bounded on the side with a book binding adhesive or adhesive tape on the side. Furthermore, the stack 51 could be shaped, such as a circular CD shape, as opposed to the rectangular or regular geometric shape shown in FIG. 5.

In such pad configuration, no release liner is required although it may be used.

Figure 6:
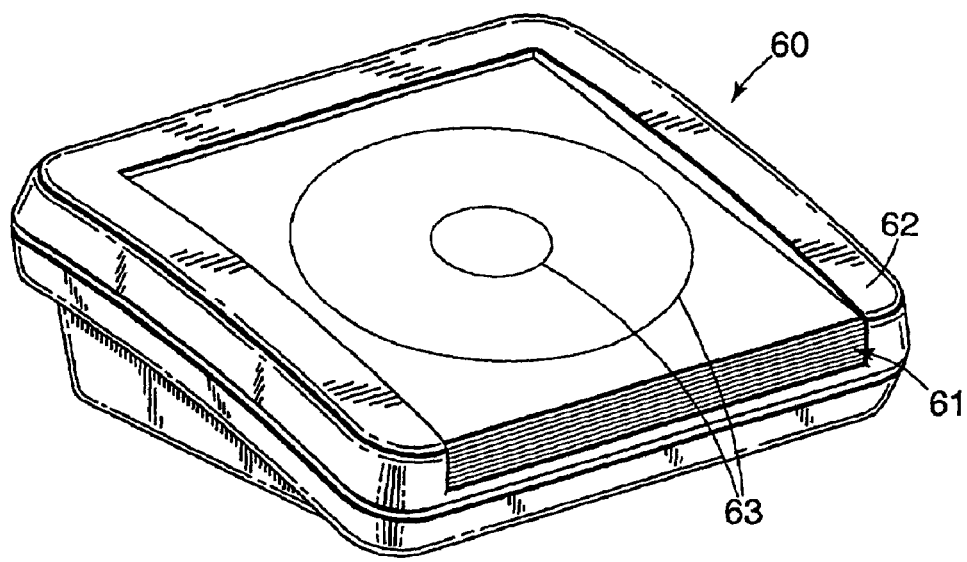
FIG. 6 is a perspective view of an alternative dispensing means.

FIG. 6 illustrates another means of dispensing printable labels, generally indicated as 60, comprising a stack 61 of die-cut or perforated labels 63, wherein the stack 61 is placed into a convenient dispenser housing 62. Once again, both the stack 61 and the dispenser 62 can be shaped other than is shown in FIG. 6.

Figure 7:
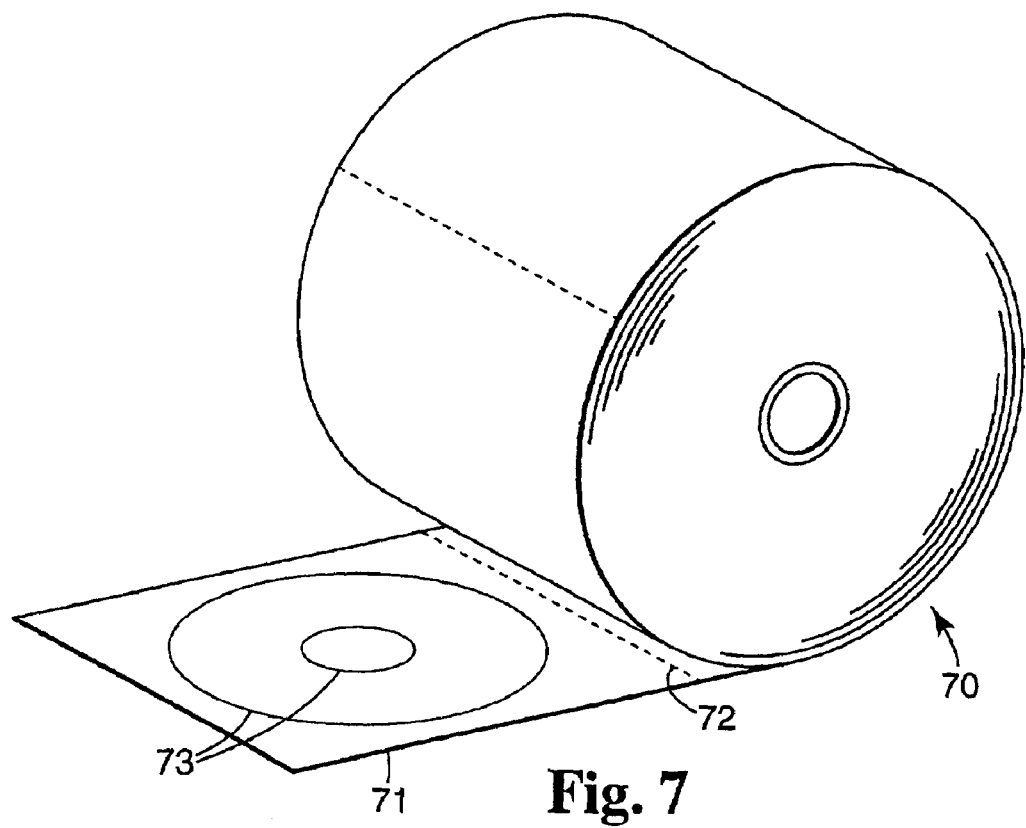
FIG. 7 is a perspective view of a roll of dispensable labels.

FIG. 7 illustrates yet another means of dispensing printable labels comprising a roll, generally indicated as 70, wherein the die-cut label 73 is carried on a backing sheet 71. Each die-cut label 71, 73 can be separated at the perforated line 72. Alternatively, the die-cut label 71, 73 can be separated by cutting apart the individual sections, which could be indicated by a cutting line at 72, rather than a perforated line. More alternatively, the label 73 is perforated in the roll sheet 71 and delivered without a separated carrier sheet.

Figure 8:
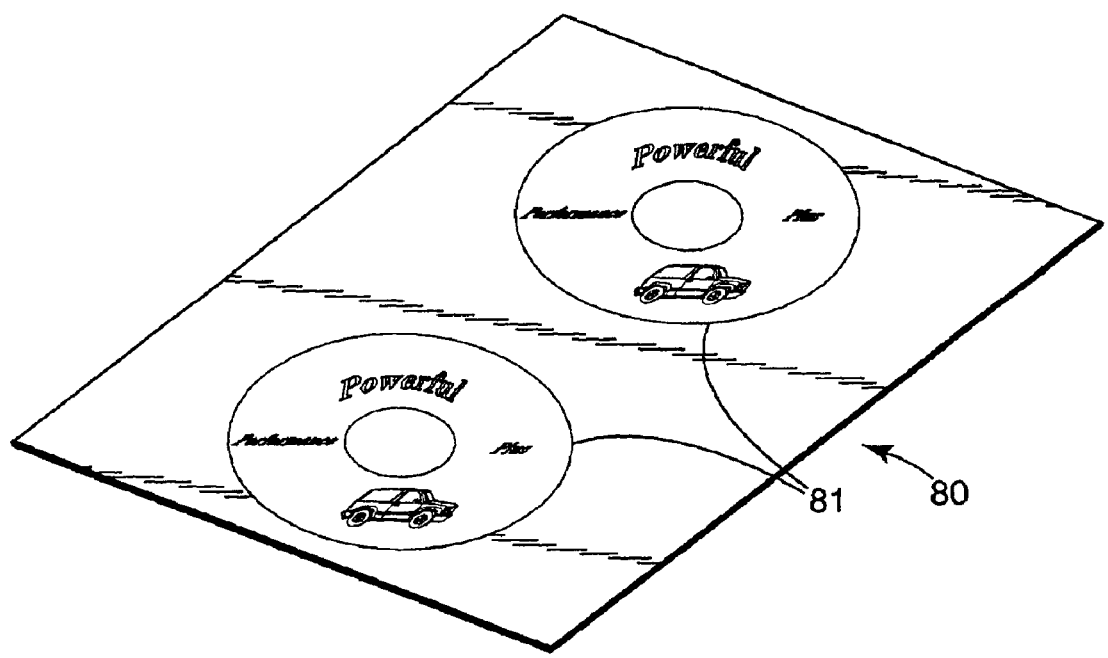
FIG. 8 is a perspective view of two printed labels on a carrier sheet.

FIG. 8 illustrates a set of printed labels 81 on a carrier or a printed perforated label sheet, generally indicated as 80. The carrier could be a silicone release liner, a premarked sheet (template) or a sheet of printer/copier paper that would hold the labels to be printed, as they were processed through an inkjet or laser jet printer. Useful template sheets may include plastic film, such as polyester, polyolefin, and film with adhesion promoter.

Advantageously, the repositionability of the labels of the present invention can be preprinted and used for personal and commercial use, such as for advertising, journaling and the like. Following are some examples of such a use of the labels. Specific configurations in no way limit the uses of such labels.

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

Further embodiments of the invention are found in the following examples, but not limited by the examples.

EXAMPLES 1–6

A series of disc labels according to the invention was prepared. The adhesive composition used in the labels for each of the examples was prepared by mixing 40 grams of thermoplastic block copolymer elastomer and 100 grams of toluene in a glass jar on a roller mill until no undissolved thermoplastic block copolymer elastomer was visible. Total mixing time was longer than 12 hours. The adhesive composition solution was then coated onto matt side of a Glossy Digital Paper (commercially available from Japan Pulp & Paper (USA) Corporation, Stone Mountain, Ga.) using a knife coater configured with a coating gap that insured a dry adhesive coating thickness of about 75 $\mu$m. Once coated, the labels were dried for about 15 minutes at 70° C.

The adhesive coated labels were further cut into ¾ inch wide strips and laminated to various substrates to measure peel adhesion. The peel adhesion was measured right after the adhesive laminate was prepared on a I-MASS peel tester with 180 peel angle at 90 ipm stripping speed and followed by a ASTM method (ASTM-D3330/3330M, Test Method A, Volume 15.09, Summary 1.1.1). The control samples, some commercially available CD labels, were also tested and the data are recorded in Table 1.

TABLE 1

| | Adhesive | | | | Instant Peel Adhesion | |
|---|---|---|---|---|---|---|
| Example | Source | Type | % Styrene | Substrate | Adhesion (g/in) | Observation |
| 1 | Fellowes | PSA | | CD Disc | N/A | Not peelable |
| | | | | Paper | N/A | Not peelable |
| | | | | PE | N/A | Not peelable |
| 2 | Memorex | PSA | | CD Disc | N/A | Not peelable |
| | | | | Paper | N/A | Not peelable |
| | | | | PE | 1134 | Not peelable |
| 3 | Avery | PSA | | CD Disc | N/A | Not peelable |
| | | | | Paper | N/A | Not peelable |
| | | | | PE | N/A | Not peelable |
| 4 | Avery Removable | PSA | | CD Disc | 170 | Clean peel |
| | | | | Paper | 167 | Clean peel |
| | | | | PE | 83 | Clean peel |
| 5 | Kraton D1107 | SIS | 14% | CD Disc | 1670 | Clean peel |
| | | | | Paper | 17 | Clean peel |
| | | | | PE | 16 | Clean peel |
| 6 | Kraton G 1657 | SEBS | 13% | CD Disc | 73 | Clean peel |
| | | | | Paper | 0 | Clean peel |
| | | | | PE | 11 | Clean peel |

Example 1–4 are control examples, wherein some commercially available CD labels were tested, including Fellows High Gloss CD Label 68644, Memorex Photo-Glass 3202-

0415 CD Labels, Avery CD Label 5692, and Avery Removable CD label 5931. The adhesive used in Examples 5 and 6 are Kraton type thermoplastic block copolymer elastomers. The instant peel adhesion was measured at various substrates, including CD disc (CD-R, P/N276791, commercially available); paper (CopyPlus, commercially available from International Paper, Memphis, Tenn.), and polyethylene film. Pressure sensitive adhesives used in above CD label examples (Example 1–4) do not have selective adhesions between disc surface and paper. However, the label made with non-PSAs (Example 5 and 6) showed selective adhesion—high adhesion on disc surfaces comparing to very low adhesion to paper.

EXAMPLES 7–30

Adhesive labels were prepared following the procedure described in conjunction with Examples 1 to 6 except the Kraton thermoplastic block copolymer elastomer was coated on 50 μm thick polyethylene phthalate film (Hostaphan, commercially available from Mitsubishi Polyester, Greer, S.C.). The dry coating thicknesses of the adhesives were controlled at 50 μm. The peel on was measured following the procedure described in Examples 1 to 6 except all the samples were dwelled on the substrates for 10 minutes before the cut labels were peeled.

All the Kraton thermoplastic block copolymer elastomers used in this invention showed non-pressure sensitive adhesive properties, having relatively high adhesion to optical discs but relatively low adhesion to paper as shown in Table 2.

TABLE 2

| Example | Thermoplastic Adhesive | | | Peel Adhesion | |
|---|---|---|---|---|---|
| | Tradename | Type | % Styrene | Substrate | Peel (g/in) |
| 7 | Kraton D1107P | SIS | 15 | Disc | 1073 |
| 8 | Kraton D1107P | SIS | 15 | Paper | 12 |
| 9 | Kraton D1111 | SIS | 22 | Disc | 1644 |
| 10 | Kraton D1111 | SIS | 22 | Paper | 13 |
| 11 | Kraton D1193 | SIS | 24 | Disc | 1137 |
| 12 | Kraton D1193 | SIS | 24 | Paper | 3 |
| 13 | Kraton G1780 | SEPS | 7 | Disc | 35 |
| 14 | Kraton G1780 | SEPS | 7 | Paper | 0 |
| 15 | Kraton G1652 | SEBS | 30 | Disc | 219 |
| 16 | Kraton G1652 | SEBS | 30 | Paper | 0 |
| 17 | Kraton G1657 | SEBS | 13 | Disc | 154 |
| 18 | Kraton G1657 | SEBS | 13 | Paper | 0 |
| 19 | Kraton G1650 | SEBS | 30 | Disc | 360 |
| 20 | Kraton G1650 | SEBS | 30 | Paper | 0 |
| 21 | Kraton G1726 | SEBS | 30 | Disc | 10 |
| 22 | Kraton G1726 | SEBS | 30 | Paper | 0 |
| 23 | Kraton 1101 | SBS | 31 | Disc | 858 |
| 24 | Kraton 1101 | SBS | 31 | Paper | 0 |
| 25 | Kraton 1118 | SBS | 31 | Disc | 892 |
| 26 | Kraton 1118 | SBS | 31 | Paper | 0 |
| 27 | Kraton 1122 | SBS | 39 | Disc | 517 |
| 28 | Kraton 1122 | SBS | 39 | Paper | 0 |
| 29 | Kraton RP6918 | SEPS | 35 | Disc | 790 |
| 30 | Kraton RP6918 | SEPS | 35 | Paper | 12 |

EXAMPLES 31–46

Adhesive labels were prepared following the procedure described in cojunction with Examples 7 to 30 except the dry coating thickness was varied. The peel adhesion was measured following the procedure described in example 1 to 6 except some samples were aged on discs at room temperature before they were peeled. All the data in Table 3 are peel adhesion from disc surfaces.

TABLE 3

| | | Thickness | Peel Adhesion | | |
|---|---|---|---|---|---|
| Example | Adhesive | (μm) | Instant | 7 Day | 14 day |
| 31 | G1652 | 12.5 | 81 | 224 | 362 |
| 32 | G1652 | 25 | 29 | 404 | 343 |
| 33 | G1652 | 58 | 36 | 208 | 502 |
| 34 | G1652 | 75 | 59 | 374 | 257 |
| 35 | G1726 | 12.5 | 4 | 2 | 14 |
| 36 | G1726 | 25 | 3 | 4 | 5 |
| 37 | G1726 | 58 | 10 | 16 | 8 |
| 38 | G1726 | 75 | 7 | 12 | 7 |
| 39 | G1650 | 12.5 | 176 | 571 | 574 |
| 40 | G1650 | 25 | 453 | 869 | 794 |
| 41 | G1650 | 58 | 374 | 1096 | 884 |
| 42 | G1650 | 75 | 333 | 1281 | 608 |
| 43 | G1657 | 12.5 | 31 | 737 | 703 |
| 44 | G1657 | 25 | 17 | 631 | 619 |
| 45 | G1657 | 58 | 8 | 291 | 269 |
| 46 | G1657 | 75 | 8 | 215 | 185 |

EXAMPLES 47–51

Adhesive labels were prepared following the procedure described in conjunction with Examples 7 to 30 with the dry coating thickness is about 50 μm except Thermoplastic block copolymer elastomers were blended. The peel adhesion was measured following the procedure described in Example 1 to 6.

| Examples | Adhesive | Peel Adhesion (g/in) | | | |
|---|---|---|---|---|---|
| | | Initial | 10 minutes | 30 minutes | 60 minutes |
| 47 | 100% G1657 | 23 | 18 | 34 | 47 |
| 48 | 75% G1657 25% D1107 | 124 | 158 | 187 | 201 |
| 49 | 50% G1657 50% D1107 | 325 | 374 | 480 | 457 |
| 50 | 25% G1657 75% D1107 | 396 | 665 | 1127 | 1469 |
| 51 | 100% D1107 | 1345 | 1073 | 2570 | 2842 |

What is claimed:

1. An article comprising:
   a backing having two major surfaces,
   a layer of repositionable non-pressure sensitive adhesive comprising a thermoplastic block copolymer elastomer coated onto at least one major surface of the backing, wherein the adhesive has a storage modulus at room temperature greater than $3 \times 10^5$ Pascals, and
   an optical recording medium having a first major surface and a second major surface opposite the first major surface, the first major surface adhered to the layer of repositionable non-pressure sensitive adhesive;
   wherein the adhesion of the repositionable non-pressure sensitive adhesive is greater than 3 ounces per inch on the first major surface of the optical recording medium and is less then 3 ounces per inch on skin and paper.

2. The article according to claim 1 wherein the thermoplastic block copolymer elastomer comprises at least one polystyrene block.

3. The article according to claim 2 wherein the thermoplastic block copolymer elastomer comprises 10% to 30% of polystyrene block.

4. The article according to claim 1 wherein the adhesion to the first major surface is in the range 5–40 ounces per inch.

5. The article according to claim 4 wherein material forming the first major surface of the optical recording medium is selected from the group consisting of polycarbonate, polyvinyl chloride, polyester, and glass.

6. The article according to claim 5 wherein the first major surface of the optical recording medium is a non-reading side of the optical recording medium.

7. The article according to claim 1 wherein the backing is selected from the group consisting of polyester film, polyolefin film, paper, coated paper, metallized film, foil, nonwovens and cardstock.

8. The article according to claim 1 wherein the adhesive has an adhesion range of 3 to 40 ounces per inch when adhered to the first major surface of the optical recording medium and an adhesion of less than 8 ounces per inch when adhered to standard white paper having a standard weight of 20/50 pounds.

9. The article according to claim 1 wherein the adhesion range on the first major surface is about 5 to about 10 ounces per inch and the adhesion range on paper and skin is less than about 1 ounce per inch.

10. The article according to claim 1 and further comprising:

an ink receptive coating on one major surface of the backing.

* * * * *

UNITED STATES PATENT AND TRADEMARK OFFICE
CERTIFICATE OF CORRECTION

PATENT NO.    : 6,884,504 B2
DATED         : April 26, 2005
INVENTOR(S)   : Liu, Junkang J. et al.

It is certified that error appears in the above-identified patent and that said Letters Patent is hereby corrected as shown below:

<u>Title page,</u>
Item [56], References Cited, OTHER PUBLICATIONS, "Duhlauist Criterion" reference, delete "Ed By Satas", insert in place thereof -- Ed. By E. Satas --
"Product Pictures (pp. 1-7)" reference, delete "LabelMaster®", insert in place thereof -- LabelMaster™ --;
"Product Pictures (pp. 1-2)" reference, delete "3 M", insert in place thereof -- 3M --;
"Product Pictures (pp. 1-4)" reference, delete "(pp. 1-4)3M", insert in place thereof -- (pp. 1-4) 3M --;
"Product Pictures (pp. 1-4)" reference, delete "Clothes", insert in place thereof -- Cloths --;

<u>Column 3,</u>
Line 9, delete "npn-pressure" and insert in place thereof -- non-pressure --;

<u>Column 5,</u>
Line 3, after "Pascals" insert -- . --;

<u>Column 6,</u>
Line 23, delete "Alphanumericas" and insert in place thereof -- Alphanumerics --;

<u>Column 9,</u>
Line 2, delete "label" and insert in place thereof -- Label --,
Line 23, delete "on" and insert in place thereof -- adhesion --;
Line 62, delete "cojunction" and insert in place thereof -- conjunction --;

UNITED STATES PATENT AND TRADEMARK OFFICE
CERTIFICATE OF CORRECTION

PATENT NO. : 6,884,504 B2
DATED : April 26, 2005
INVENTOR(S) : Liu, Junkang J. et al.

It is certified that error appears in the above-identified patent and that said Letters Patent is hereby corrected as shown below:

Column 10,
Line 25, delete "Thermoplastic" and insert in place there of -- thermoplastic --;
Line 58, delete "then" and insert in place there of -- than --.

Signed and Sealed this

Twenty-sixth Day of July, 2005

JON W. DUDAS
*Director of the United States Patent and Trademark Office*